Aug. 5, 1952     L. R. WOSIKA     2,605,611
THRUST BALANCE STRUCTURE FOR ROTARY GAS ENGINES
Filed Aug. 16, 1948
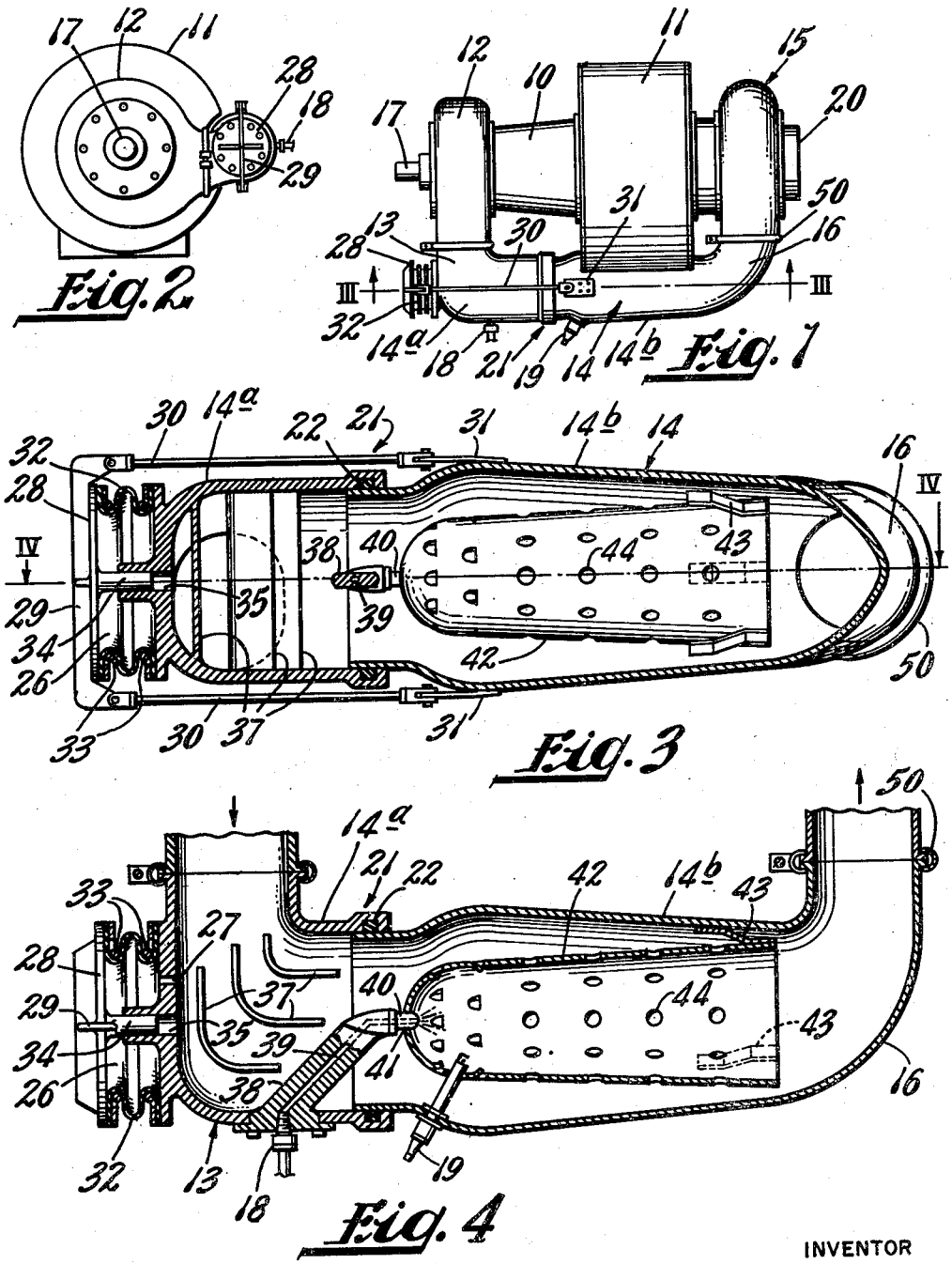
INVENTOR
L. R. WOSIKA
BY
ATTORNEY Patented Aug. 5, 1952

2,605,611

UNITED STATES PATENT OFFICE 2,605,611

THRUST BALANCE STRUCTURE FOR ROTARY GAS ENGINES

Leon R. Wosika, San Diego, Calif., assignor to Solar Aircraft Company, San Diego, Calif., a corporation of California Application August 16, 1948, Serial No. 44,537

4 Claims. (Cl. 60—39.32)

This invention relates to rotary gas engines of the type in which the combustion chamber is eccentrically disposed with respect to the axis of rotation of the compressor and turbine rotors, and is connected at each end to the compressor and turbine casings.

An object of the invention is to provide a practicable support for the combustion chamber that will permit the unavoidable differential longitudinal expansion and contraction between the turbine and combustion chamber assemblies resulting from temperature changes, but will resist the longitudinal forces resulting from pressures within the combustion chamber.

Other more specific objects and features of the invention will become apparent from the description of the invention to follow.

Briefly, gas engines of the type to which this invention relates comprise a turbine assembly consisting of a rotary compressor and a turbine on a common shaft but axially (longitudinally) spaced from each other, and a combustion chamber, or plurality of combustion chambers, extending parallel to but laterally displaced from the turbine assembly and connected at one end by an elbow to the outlet of the compressor and connected at the other end by an elbow to the inlet of the turbine. The combustion chamber cannot be rigid longitudinally, because it does not have the same thermal expansion and contraction as the turbine assembly between operating and non-operating temperatures. On the other hand, the necessary differential expansion cannot readily be provided for by simply providing a slip joint in the combustion chamber, because longitudinal pressure forces of substantial magnitude are developed within the combustion chamber and applied to the elbows at the opposite ends thereof; such forces, applied to the elbows, develop cantilever forces in the elbows that are difficult to resist.

In accordance with the present invention, the cantilever forces are prevented by providing an end wall beyond the elbow at one end of the combustion chamber and connected with the combustion chamber by an extensible wall, this end wall being connected to the opposite end of the combustion chamber by exterior struts, so that the longitudinal pressure forces between the combustion chamber ends are directly resisted by the struts and are not applied through the elbows to the turbine assembly. An extensible wall or slip joint in the combustion chamber between the two elbows then takes care of all differential expansion between the combustion chamber and turbine assembly, without having to withstand the pressure forces within the combustion chamber.

In the drawing:

Fig. 1 is a plan view of a rotary gas engine incorporating an expansion balance structure in accordance with the invention;

Fig. 2 is an end elevation view looking at the left end of Fig. 1;

Fig. 3 is a vertical section taken in the plane III—III of Fig. 1; and

Fig. 4 is a horizontal section taken in the plane IV—IV of Fig. 3.

Figs. 1 and 2 show a rotary gas engine having an air compressor 10, the intake end of which (at the right) is connected to an air silencer 11, and the left or outlet end of which is connected by a scroll 12 to an elbow section 13 which connects to the forward end of a combustion chamber 14. A gas turbine 15 is positioned back of the air intake silencer 11 and is connected by an elbow 16 to the rear or outlet end of the combustion chamber 14. The engine has a shaft 17 which projects from the forward end as shown and carries the rotors of the compressor 10 and of the gas turbine 15, the turbine 15 driving the compressor 10 and also being capable of delivering external power through the shaft 17.

In operation, the air received through the air silencer 11 is compressed by the compressor 10 and delivered through the scroll 12 and the elbow 13 to the forward end of the combustion chamber 14, where it is mixed with fuel delivered through a line 18 and ignited by a spark plug 19. The burning fuel-air mixture attains a high temperature and increased volume, and the resultant products of combustion are delivered through the elbow 16 to the turbine 15, where energy is absorbed for the rotation of the shaft 17. The spent exhaust gases are exhausted axially through an exhaust discharge port 20.

As so far described, the structure is conventional. However, in actual practice, difficulties have been encountered due to the fact that the expansion of the turbine assembly consisting of the aligned elements associated with the shaft 17 is not the same as the expansion of the combustion chamber 14, so that some means must be provided to accommodate the relative longitudinal movement between the turbine assembly and the combustion chamber.

Such movement is readily provided for by making the combustion chamber 14 in two sections, 14a and 14b, respectively, which sections are connected together by a slip joint as indicated at 21. Thus the forward end of the section 14b is telescoped into the rear end of the section 14a, and a packing ring 22 is provided to effect a seal between the telescoped sections.

However, the provision of the slip joint 21 alone does not produce a satisfactory result, because of the fact that substantial gas pressures exist within the combustion chamber, which gas pressures produce forces tending to separate the front and rear sections. In the absence of a structure in accordance with the present invention, to be described, these forces develop cantilever forces in the elbows 13 and 16 which are applied to the turbine assembly through the scroll 12 of the compressor 10 and through the gas turbine 15, respectively.

In accordance with the present invention, I prevent the application of cantilever forces to the elbows 13 and 16 by providing an auxiliary structure that directly opposes the separating forces developed by the gas pressure in the combustion chamber.

To this end, longitudinal force on the elbow 13 is balanced by creating an auxiliary chamber 26 exterior of the elbow 13 and connected therewith by a passage 27, so that the same pressure existing within the elbow section 13 is applied to a portion of the exterior thereof. This neutralizes the force of the gas pressure acting longitudinally against the interior of the elbow 13.

The longitudinal force acting on the elbow 16 due to gas pressure therewithin is balanced by the substantially equivalent force developed in the chamber 26 and applied to the outer end wall 28 of that chamber. Thus this outer end wall 28 is connected by a yoke 29 and a pair of diametrically opposite struts 30 and links 31 to the rear section 14b of the combustion chamber which is formed integrally with the elbow section 16. By suitably proportioning the area of the end wall 28, the force resulting from gas pressure acting thereagainst can be made substantially equal and opposite to the longitudinal thrust developed by the gas pressure within the elbow 16 that tends to separate the telescoped sections.

To permit free relative movement between the elbow 13 and the end wall 28, the lateral wall 32 of the chamber 26 consists of an expansible bellows. To better enable the bellows to withstand relatively high pressure it may be reinforced by annular rings 33 positioned in the furrows or convolutions of the bellows.

The construction described permits the rear section 14b and the rear elbow 16 of the combustion chamber to move longitudinally with the rear end of the turbine assembly. At the same time the front section 14a and the front elbow 13 of the combustion chamber are free to move longitudinally with the front end of the turbine assembly.

To reinforce the end wall 28 against lateral movement, the head may have secured thereto an inwardly extending pin 34 which slides in an aperture 35 provided therefor in the elbow 13. The elbow 13 may have baffles 37 therein for facilitating the change in direction of the air stream flowing therethrough.

As clearly shown in Fig. 4, the fuel line 18 communicates with a nozzle structure 38 which provides a passage 39 for conveying the fuel from the line 18 to a burner nozzle 40. This burner nozzle 40 projects through an aperture 41 in the forward end of a combustion chamber liner 42 which liner tapers from a small diameter at the forward end to a large diameter at the rear end, where it is secured, as by supporting strips 43, to the combustion chamber section 14b. The liner 42 is provided with a plurality of distributed holes 44 through which the air is introduced into the liner in a suitable manner to support combustion.

An advantage of the particular construction shown, including the slip joint 21 between the combustion chamber sections 14a and 14b, is that by opening the combustion chamber at the slip joint 21, ready access is had to the fuel nozzle 40. Such opening of the combustion chamber is facilitated by a clamp joint 50 between the elbow 16 and the turbine 15, which permits complete removal of the combustion chamber section 14b from the section 14a. It will be noted that the combustion chamber liner 42 is supported by the combustion chamber section 14b, so that it is removed therewith, leaving the end of the nozzle open for inspection and cleaning.

Although for the purpose of explaining the invention a particular embodiment thereof has been shown and described, obvious modifications will occur to a person skilled in the art, and I do not desire to be limited to the exact details shown and described.

I claim:

1. A combustion chamber assembly comprising a primary combustion chamber duct section having one end adapted to be rigidly and detachably connected to a first duct section; an elbow slidably connected at one end to the other end of said primary duct section and providing an end section for closing the other end of said primary duct section and having its other end rigidly connected to a second duct section; an expansible member mounted on said elbow and cooperating with the wall of said elbow end section opposite said one end of said elbow to form therewith an expansion chamber; means for placing said expansion chamber and the interior of said elbow in fluid communication; and means comprising longitudinally extending struts bridging said expansible member and pivotally secured at their opposite ends respectively to the free end of said expansible member and to said primary duct section for anchoring the end of said expansible member opposite said wall of said elbow end section to said primary duct section whereby axial thrust forces internally of said combustion chamber resulting from the combustion gas pressures are also effective within said expansion chamber and counterbalanced by the opposing axial thrust forces in said expansion chamber and, upon disconnection of said primary duct section and said first duct section, said primary duct section may be slidably disassociated from said elbow and swung to a position to expose the interior of said elbow for inspection and cleaning.

2. A combustion chamber assembly comprising a primary combustion chamber duct section having one end adapted to be rigidly connected to a first duct section; an elbow slidably connected at one end to the other end of said primary duct section and providing an end section for closing the other end of said primary duct section and having its other end connected to a second duct section; a fuel nozzle supported by said elbow and having an end extending into said primary duct section; an expansible member mounted on said elbow and cooperating with the wall of said elbow opposite said one end of said elbow to form therewith an expansion chamber; means placing said expansion chamber and the interior of said elbow in fluid communication;

means anchoring the end of said expansible member opposite said wall of said elbow to said primary duct section whereby axial thrust forces internally of said combustion chamber resulting from the combustion gas pressures are also effective within said expansion chamber and counterbalanced by the opposing axial thrust forces in said expansion chamber; and a clamp joint connecting said one end of said primary duct section to said first duct section whereby upon opening of said clamp joint said primary duct section can be slidably disassociated from said elbow to expose said fuel nozzle for inspection and cleaning.

3. A combustion chamber as defined in claim 2 together with a combustion chamber liner supported within said primary duct section and cooperating with said end of said fuel nozzle when said elbow and said primary duct section are in assembled relation to center the upstream end of said liner.

4. A pressure compensating duct comprising a primary duct section having an end wall against which axial thrust is developed by fluid pressure within the duct and an opposed open end; a secondary duct section having an end wall against which axial thrust is developed by fluid pressure within the duct and an opposed open end; a sealing ring in the open end of one of said duct sections constituting the sole means adapting said duct section for slidably and sealingly receiving the open end of said other duct section thereby providing a sealed duct wherein the thrust bearing walls of said respective duct sections are disposed at opposite ends of said duct; an axially expansible chamber secured to one of said duct sections exteriorly thereof and having a movable wall opposed to the thrust bearing wall of said last mentioned one duct section whereby axial thrust developed by fluid pressure in said expansion chamber will act between said movable wall and the face of said thrust bearing wall of said last mentioned one duct section opposite that upon which axial thrust in said duct acts; passage means connecting said expansion chamber to the interior of said duct whereby said expansion chamber is subjected to the pressures existing in said duct; and means connecting said movable wall of said expansion chamber to said other duct section comprising longitudinally extending struts bridging said expansible member and pivotally secured at their opposite ends respectively to the free end of said expansible chamber and said primary duct section whereby the axial thrust forces acting on said movable wall will react on said other duct section in opposition to the thrust forces acting on said thrust bearing wall of said other duct section and, upon axial disassociation of said primary duct section and said secondary duct section, said primary duct section may be swung to a position to expose the interior of said secondary duct section for inspection and cleaning.

LEON R. WOSIKA.

REFERENCES CITED

The following references are of record in the file of this patent:

UNITED STATES PATENTS

| Number | Name | Date |
|---|---|---|
| 853,974 | Hayden | May 21, 1907 |
| 2,348,833 | Miller | May 16, 1944 |
| 2,355,440 | Howard | Aug. 8, 1944 |
| 2,439,273 | Silvester | Apr. 6, 1948 |
| 2,445,114 | Halford | July 13, 1948 |

FOREIGN PATENTS

| Number | Country | Date |
|---|---|---|
| 588,082 | Great Britain | May 14, 1947 |
| 534,704 | Germany | Oct. 1, 1931 |